UNITED STATES PATENT OFFICE.

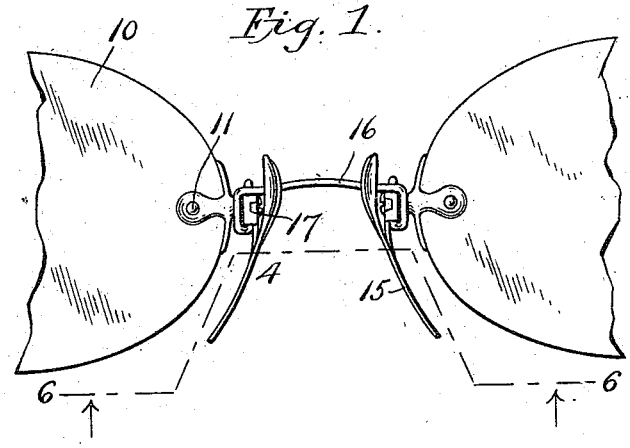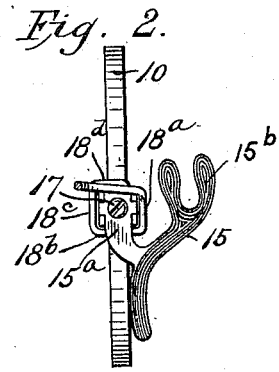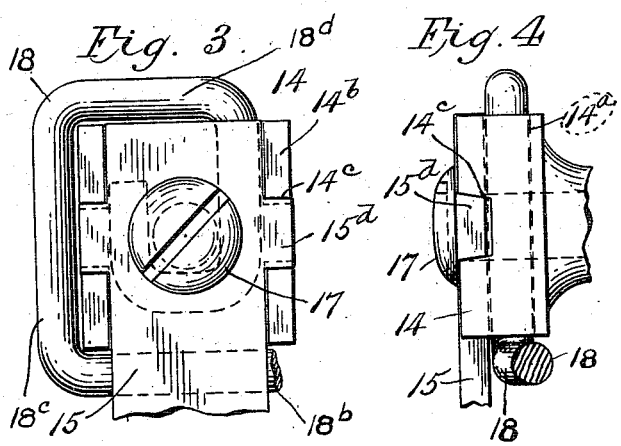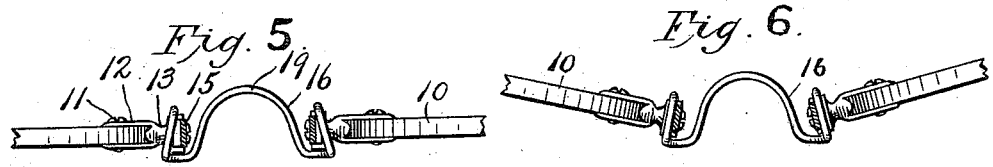

JAMES M. CHAPPEL, OF CLEVELAND, OHIO.

EYEGLASS-MOUNTING.

983,204.

Specification of Letters Patent.   Patented Jan. 31, 1911.

Application filed May 18, 1907.   Serial No. 374,521.

*To all whom it may concern:*

Be it known that I, JAMES M. CHAPPEL, residing at Cleveland, in the county of Cuyahoga and State of Ohio, have invented a certain new and useful Improvement in Eyeglass-Mountings, of which the following is a full, clear, and exact description, reference being had to the accompanying drawings.

My invention relates to eye glass mountings and particularly to the construction of the spring or bridge piece.

The purposes of my invention are to do away with the large bridge spring heretofore employed, and to provide a spring which is light in weight, neat and attractive in appearance, which will hold the lenses firmly in position on the nose; and which will permit the lenses to be moved or twisted relative to each other in any direction more freely and to a greater extent than has been possible with the springs heretofore employed, and without any danger of breaking or bending the springs beyond the limit of elasticity.

My invention may be briefly summarized as consisting in certain novel details of construction and combinations and arrangements of parts which will be described in the specification and set forth in the appended claims.

For a better understanding of my invention, reference is to be had to the accompanying drawings in which—

Figure 1 is a partial rear elevation of eye glasses equipped with my invention; Fig. 2 is a transverse section through the spring or bridge piece; Fig. 3 is an enlarged detail view showing particularly the manner in which the spring passes about the boxes and is secured therein; Fig. 4 is a side view of the same; Fig. 5 is a section approximately along the line 6—6 of Fig. 1 in the direction indicated by the arrows; Fig. 6 is a similar view showing the lenses bent out of alinement for the purposes of being placed upon the nose; and Fig. 7 is a plan view of the spring detached from the mountings.

Referring now to the figures of the drawing 10 represents the lenses to which are secured by screws 11, lens attaching devices comprising straps 12 having studs or posts 13, on the outer ends of which are boxes 14, in which are tightly clamped the ends of the guards 15 and the spring 16, by screws 17 which engage threaded openings in the bases of the boxes and studs. Each of the boxes is provided with a base $14^a$ and two parallel sides or flanges $14^b$ each of which has between the upper and lower ends thereof a notch $14^c$ having inwardly inclined sides.

The guards 15 are each provided with a shank or supporting portion $15^a$ and with a nose clamping portion $15^b$ extending partially above and partially below the shank $15^a$. The shank $15^a$ is received between the sides of this box and is provided with an opening to receive the holding screw 17, and on the sides thereof opposite the opening with lateral lugs or projections $15^d$ having inwardly inclined or wedge shaped sides and which fit tightly in the notches $14^c$ in the box.

The eye glass spring or bridge piece 16 is clamped at its ends between the guards and the bases of the boxes and is provided with bent portions or coils 18 extending around the boxes. The spring bridge piece consists of a single piece and is preferably formed of wire of small diameter and having great resilience. As here shown the diameter of the wire is uniform from end to end, although if desired the nose bridging portion 19 may be thicker or of greater diameter than the ends or terminals. The nose bridging portion 19 which may be straight or bowed in any manner desired is located between the ends of the boxes, the spring extending outward from the ends of the nose bridging portion to the rear of the boxes, and then extending around the latter. In this particular instance each coiled terminal 18 consists of a portion $18^a$ extending downward along the rear of the box, a portion $18^b$ extending forward along the bottom of the box and along the outer side of the portion $15^a$ of the guard, a portion $18^c$ extending upward along the front of the box, a portion $18^d$ extending rearward along the top of the box, and a portion $18^e$ extending downward into the box, said last named portion being adapted to take around the screw 17 and having an upwardly extending terminal $18^f$. The coils or portions bent about the boxes conform in shape to the configuration of the boxes and the portions $18^a$, $18^b$, $18^c$ and $18^d$ are bent at right angles to one another, so that said portions will lie closely along the respective sides of the boxes. The purpose of the coils, as is evident, is to permit the glasses or lenses to be moved freely relatively to each other, and their arrangement is such that for all ordinary relative movements of the lenses substantially all the strain will occur in the coils, the particular portion or portions of the coils which yield or bend depending on the direction of relative movement of the lenses. Accordingly as the portion of the spring between the guards is subjected to very slight strains or bending the guards will remain in their proper previously fixed or adjusted positions. By referring particularly to Figs. 1, 4, 5, 6 and 7 it will be seen that the portions 18$^b$ of the coils which extend forwardly along the lower sides of the boxes, are inclined to the plane of the portions 18$^c$, 18$^d$ and 18$^e$, and to the sides of the guards. The purpose of this is to permit a relative movement between the portions 18$^b$ of the coils and the guards when the lenses are bent out of alinement for the purpose of being placed on the nose. Said portions 18$^b$ extend forwardly and inwardly the forward ends being substantially in engagement with the edges of the guards. By referring to Figs. 5 and 6 it is seen that when the lenses are moved out of alinement the guards approach or engage said inclined portions 18$^b$, the portions 18$^c$ being subjected to a twist or torsional strain and permitting this movement. After the lenses have been moved a certain distance and the guards engage the portions 18$^b$ further twisting of the portions 18$^c$ is prevented, hence there is no danger of said portions being bent or twisted beyond the limit of elasticity. The coils will also permit relative movements of the lenses in other directions.

Before the ends of the coils are inserted in the boxes the terminals 18$^f$ are bent outwardly out of the plane of the portions 18$^c$, 18$^d$ and 18$^e$ as shown clearly in Fig. 7. The result of this is that when the holding screws 17 are tightened the forward ends of the portions 18$^f$ of the coils will be caused to hug the edges of the guards and the coils will be normally maintained in the positions desired.

It will be seen that the ends of the bowed portion of the spring terminate at the rear of the boxes and pass outward and are then bent downward forming the portions 18$^a$ which portions are at the rear of the boxes and are concealed from view when the glasses are in place on the nose. The portions 18$^e$ which extend upwardly along the front of the boxes are practically the only parts of the coils which are exposed, but these portions simply undergo a twist or torsional stress when the lenses are moved relatively to each other, their position relative to the front of the boxes being practically fixed. The portions of the coils below and at the rear of the boxes are the parts which move relative to the boxes when the lenses are moved relative to each other, and as these parts are practically concealed from view, the spring will have the same appearance at all times when the mounting is viewed from the front.

I do not desire to be confined to the exact details shown but aim in my claims to cover all modifications which do not involve a departure from the spirit and scope of my invention.

Having described my invention, I claim:

1. In an eye glass mounting, lenses, lens attaching devices secured thereto, said devices comprising studs or posts with boxes at their free ends, guards and a bridge spring secured in said boxes, said spring having a nose bridging portion and extending to the rear of the lens attaching devices, and from the rear of the lens attaching devices extending forwardly along the lower sides of the latter, outside of the guards, thence upwardly along the front sides of the lens attaching devices, thence rearwardly and thence into the boxes at the tops of the same, the rear parts of the forwardly extending portions of the spring being spaced from the guards so that there may be free relative movement between these portions and the guards when the lenses are bent out of alinement.

2. In an eye glass mounting, lenses, lens attaching devices secured thereto, said devices comprising studs or posts, with boxes at their free ends, guards, and a bridge spring secured in said boxes, said spring having a nose bridging portion and extending to the rear of the lens attaching devices, thence downwardly, thence forwardly along the lower sides of the boxes outside of the guards, thence upwardly along the front sides of the boxes, thence rearwardly, and thence into the boxes at the tops of the same, the downwardly extending portions and the rear parts of the forwardly extending portions of the spring being spaced from the guards so that the forwardly extending portions and the guards may swing toward each other when the lenses are bent out of alinement.

3. In an eye glass mounting, lenses, lens attaching devices secured thereto, said devices comprising studs or posts with boxes at their free ends, guards and a bridge spring secured in said boxes, said bridge spring having a nose bridging portion and extending to the rear of the lens attaching devices, thence downwardly, thence forwardly along the lower sides of the boxes, the forwardly extending portions being outside of the guards and inclined inwardly toward the same, thence upwardly along the front sides of the boxes, thence rearwardly and thence into the boxes at the tops of the same.

4. In an eye glass mounting, lenses, lens attaching devices secured thereto, said devices comprising studs or posts with boxes at their free ends, guards and a bridge spring secured in said boxes, said bridge spring having a nose bridging portion which is between the boxes and extends across the inner faces of the same, and from the nose bridging portion extending to the rear of the lens attaching devices, thence downwardly, thence forwardly along the lower sides of the boxes and outside of the guards, the forwardly extending portions being inclined inwardly toward the guards so that there may be free relative movement between the guards and said forwardly extending portions when the lenses are bent out of alinement, thence upwardly along the front sides of the boxes, thence rearwardly over the boxes, and thence into the boxes at the tops of the same.

In testimony whereof I affix my signature in the presence of two witnesses.

JAMES M. CHAPPEL.

Witnesses:
A. F. KWIS,
RAE WEISS.